J. H. GOSS & G. R. LEGGETT.
MACHINE FOR ATTACHING GLOVE FASTENERS.
APPLICATION FILED JUNE 28, 1909.

956,848.

Patented May 3, 1910.

Witnesses:
Lillie M. Perry.
D. A. Edelin.

Inventors.
John H. Goss,
George R. Leggett,
by Wm. H. Finckel
Atty.

J. H. GOSS & G. R. LEGGETT.
MACHINE FOR ATTACHING GLOVE FASTENERS.
APPLICATION FILED JUNE 28, 1909.

956,848.

Patented May 3, 1910.
7 SHEETS—SHEET 2.

Fig. 2.

Witnesses.
Lillie M. Perry.
D. W. Edelin.

Inventors.
John H. Goss.
George R. Leggett.
by W. H. Finckel
Atty

J. H. GOSS & G. R. LEGGETT.
MACHINE FOR ATTACHING GLOVE FASTENERS.
APPLICATION FILED JUNE 28, 1909.

956,848.

Patented May 3, 1910.
7 SHEETS—SHEET 4.

Fig. 4.

Witnesses.
Lillie M. Perry.
D. A. Edelin.

Inventors.
John H. Goss.
George R. Leggett.
by Wm. N. Finerel
Atty.

J. H. GOSS & G. R. LEGGETT.
MACHINE FOR ATTACHING GLOVE FASTENERS.
APPLICATION FILED JUNE 28, 1909.

956,848.

Patented May 3, 1910.

J. H. GOSS & G. R. LEGGETT.
MACHINE FOR ATTACHING GLOVE FASTENERS.
APPLICATION FILED JUNE 28, 1909.

956,848.

Patented May 3, 1910.

Witnesses:
Lillie M. Perry
D. W. Edelin

Inventors.
John H. Goss.
George R. Leggett.
by Wm. H. Finckel
Atty.

UNITED STATES PATENT OFFICE.

JOHN H. GOSS AND GEORGE R. LEGGETT, OF WATERBURY, CONNECTICUT, ASSIGNORS TO SCOVILL MANUFACTURING COMPANY, OF WATERBURY, CONNECTICUT, A CORPORATION OF CONNECTICUT.

MACHINE FOR ATTACHING GLOVE-FASTENERS.

956,848.    Specification of Letters Patent.    Patented May 3, 1910.

Application filed June 28, 1909. Serial No. 504,823.

*To all whom it may concern:*

Be it known that we, JOHN H. GOSS and GEORGE R. LEGGETT, citizens of the United States, residing at Waterbury, in the county of New Haven and State of Connecticut, have invented a certain new and useful Improvement in Machines for Attaching Glove-Fasteners, of which the following is a full, clear, and exact description.

The object of this invention is to provide a simple and efficient machine for attaching articles to fibrous or textile material by means of eyelets, without cutting holes for the passage of the barrels of the eyelets.

The invention is specially designed for use in eyeletting snap-fasteners to thin fabric or textile gloves, in such way as to avoid cutting the fabric, and to that extent rendering the attachment of the fastener more secure and less liable to pull out in use; this pulling out or insecurity of the fastener being a common fault in some present methods of attaching such fasteners to gloves and other articles made of thin or stretchy material.

The invention consists of fixed needles for piercing the glove or other article in the presence of the eyelet, and while said eyelet is supported upon a movable support which recedes under the descent of the needle and glove or other article and leaves the eyelet in the glove or other article, the fixed needle and the eyelet support operating in conjunction with grippers for clamping the glove or other article while being acted upon for the insertion of the eyelet, and these grippers moving with and also independently of the needles and eyelet-support in the progress of the operation of inserting the eyelets in the glove or other article, all as we will proceed now more particularly to set forth and finally claim.

In the accompanying drawings, illustrating the invention, in the several figures of which like parts are similarly designated, Fig. 7 is a longitudinal section of the grippers and needle and eyelet-support as these parts appear upon the penetration of the glove preparatory to the insertion of the eyelet, and showing a modified form of needle. Fig. 8 is a view similar to Fig. 7 showing the eyelet inserted as the needle recedes. Fig. 9 is a plan view of a spring used in the spring-die of the cap-attaching mechanism. Fig. 10 is a longitudinal section, Fig. 11 is a top plan view, and Fig. 12 is an elevation at right angles to Fig. 10, of the die. Fig. 13 is a longitudinal section of the punch of the cap-attaching mechanism with an eyelet in place thereon. Fig. 14 is a side elevation, Fig. 15 is a top plan view, and Fig. 16 is a longitudinal section of an interchangeable die for attaching studs. Fig. 17 is a longitudinal section of the punch for use in connection with the dies of Figs. 14–16.

In a concurrent application for patent for machines for attaching glove fasteners, we have shown the needles as removable, and as rising to pierce the glove, while in the present invention the needles pierce the glove by a descending movement and they are unremovable, that is to say, they are fixed in their holders, and do not require to be removed for the insertion of the eyelets, but are withdrawn automatically by the operation of the machine; and, consequently, the needles herein are referred to as "fixed" needles.

The machine herein described is shown as arranged to simultaneously insert two eyelets and to attach two caps at one operation, but the invention is applicable to a machine for simultaneously inserting one or more eyelets and for attaching one or more caps, and the claims are to be understood accordingly. However, the invention will be described as applied to a machine for setting two eyelets simultaneously and attaching two caps at one operation.

Figure 2:
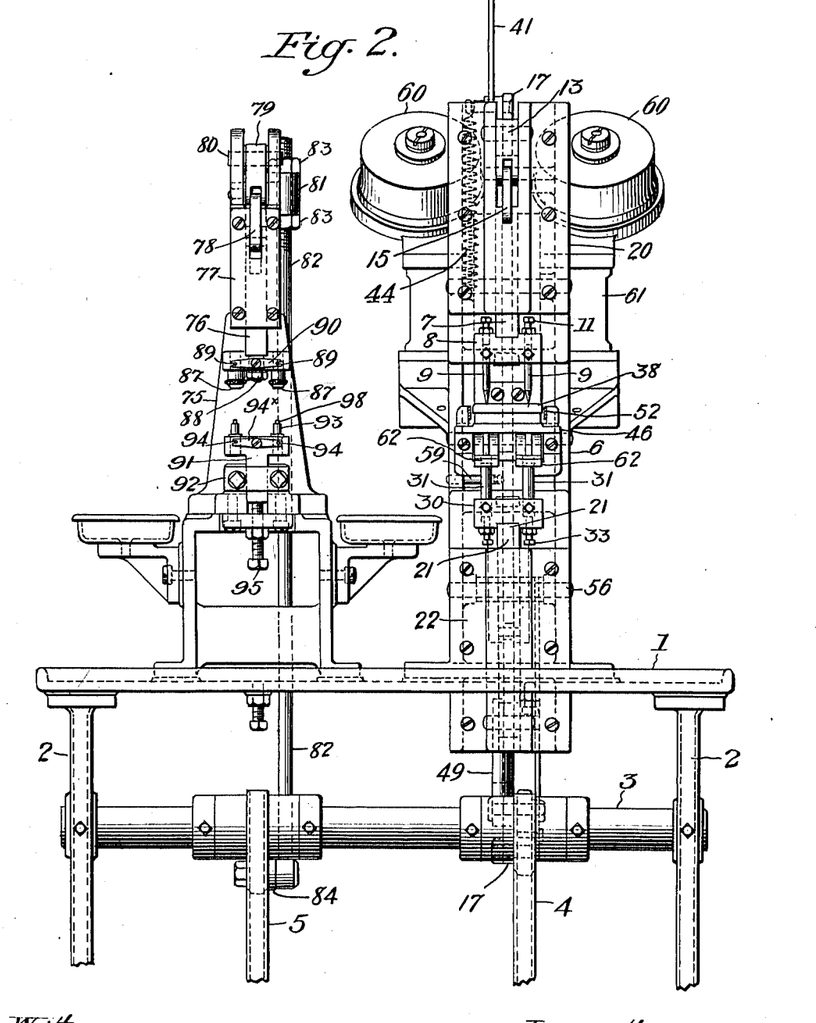
Fig. 2 is a front elevation showing the eyelet machine arranged alongside of the cap-attaching machine on the same bench or table.

As shown in Fig. 2, the eyelet-inserting and cap-attaching mechanisms may be arranged alongside of one another, upon a single bench or table 1, and this table is supported upon suitable legs or frames 2, only portions of which are shown, and which may be of approved construction, and these frames support a rod 3, on which is arranged a foot-treadle 4, for operating the eyelet-setting mechanism, and a similar foot-treadle 5, for operating the cap-attaching mechanism, although the machines may be operated by any other suitable arrangements.

Figures 1, 22:
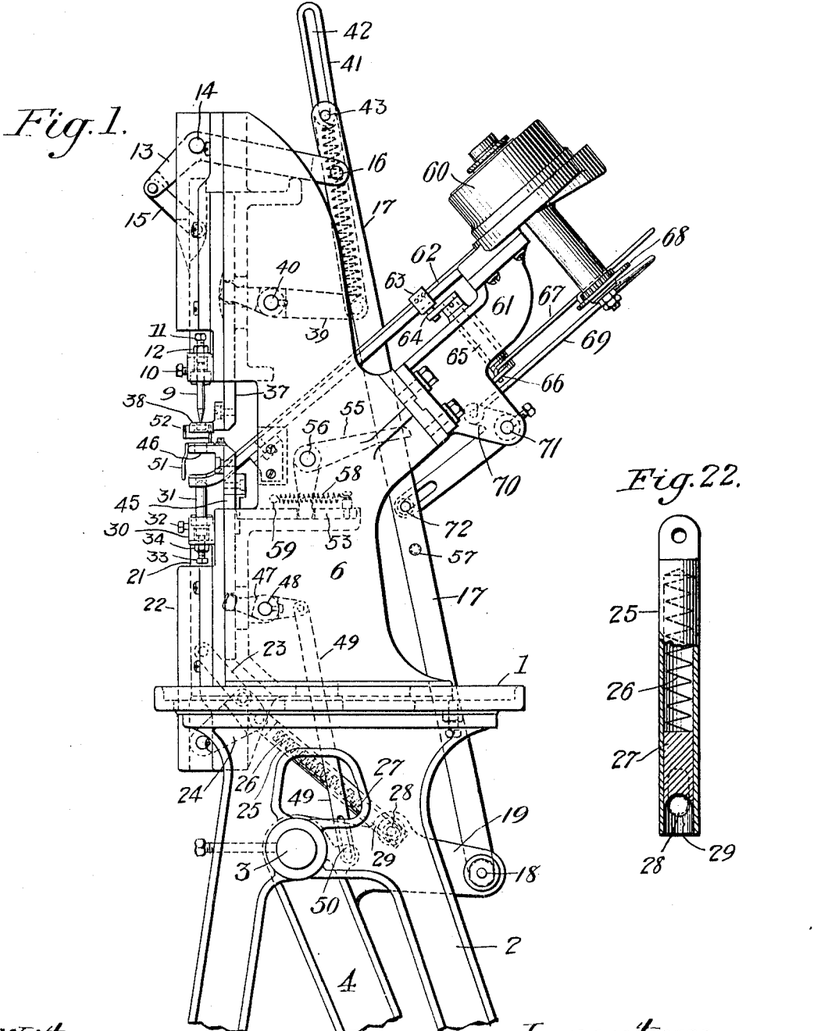
Figure 1 is a side elevation.
Fig. 22 is a longitudinal section of a connecting link for moving the eyelet-support.

Referring now more particularly to Figs. 1, 2, 4, 5 and 6, the eyelet-inserting machine comprises a head 6, in the upper portion of which is arranged a slide 7, having attached to it a holder 8, provided with vertical sockets in which are fixed the needles 9. These needles are secured by set-screws 10, and adjusted by set-screws 11, and set-nuts 12, so as to hold them in proper position. The slide with its attached needles is given a vertically reciprocating motion by means of a lever 13, rocking on the pivot 14, secured transversely in the head of the machine, and this lever is connected with the slide by means of a link 15. The lever 13 is pivoted at 16 to a connecting bar 17, which, as shown in Fig. 1, is connected at 18 to a crank-arm 19, operated by the treadle or other power appliance 4. The slide 7 is held in place on the head by means of a face-plate 20 bolted or otherwise secured to the head. The eyelet-support comprises a slide 21, arranged on the lower portion of the head of the machine and held therein by a face-plate 22. Vertically reciprocating motion is given to this slide by means of a link 23 connected to a rocker-arm 24, pivoted in the head, and in turn connected to the crank-arm 19 by means of a lost-motion connection 25. This lost-motion connection comprises a tubular rod, Figs. 1 and 22, containing a coiled spring 26 which acts against a pin or pins 27 which in turn bear upon the stud or pin 28, connecting the device 25 with the crank-arm 19, and this stud or pin 28 engages a slot 29 arranged longitudinally in the end of the device 25. The slide 21 has a holder 30 in which are arranged tubular uprights 31 held in place by set-screws 32, and adjusted therein by set-screws 33 and set-nuts 34. Within these uprights 31 are springs 35 against which rest the eyelet-receiving pins 36, in such manner as to normally project the pins out of the uprights in line to receive the eyelets as they are delivered from the hoppers or turrets. Thus, it will be seen, the needles are given a descending motion and the eyelet-support is given an ascending motion from the same source of power, and these motions are timed to bring the needles and eyelets in conjunction to properly pierce the glove and to insert the eyelets in the holes thus pierced, after which they recede and leave the eyelets in the glove. Adjacent and parallel to the needle-slide 7 is another slide 37 vertically arranged in the head and having a horizontally arranged gripper-jaw 38 projecting into the path of movement of the needles, and pierced vertically for the passage of the needles through it. This slide 37 is engaged by a lever 39 pivoted at 40 to the head, and its other end pivoted to a lever 41, the upper end of which has a longitudinal slot 42 engaged by a pivot-pin 43 fast on the connecting bar 17. This slot connection allows for lost-motion in the lever 39, and this lost motion is taken up by the spring 44.

Figure 4:
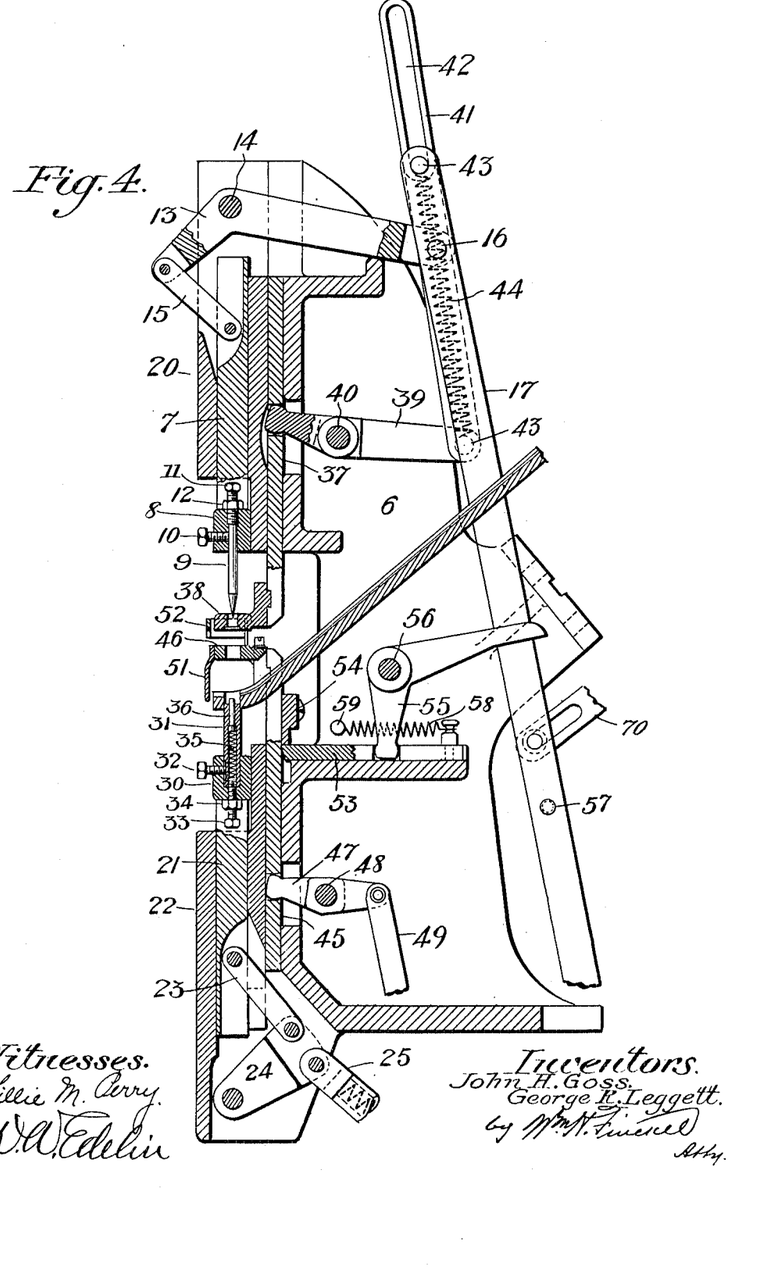
Fig. 4 is a vertical section of the eyelet-inserting mechanism in position to receive an eyelet from the eyelet-hopper or turret.
Figures 5, 6:
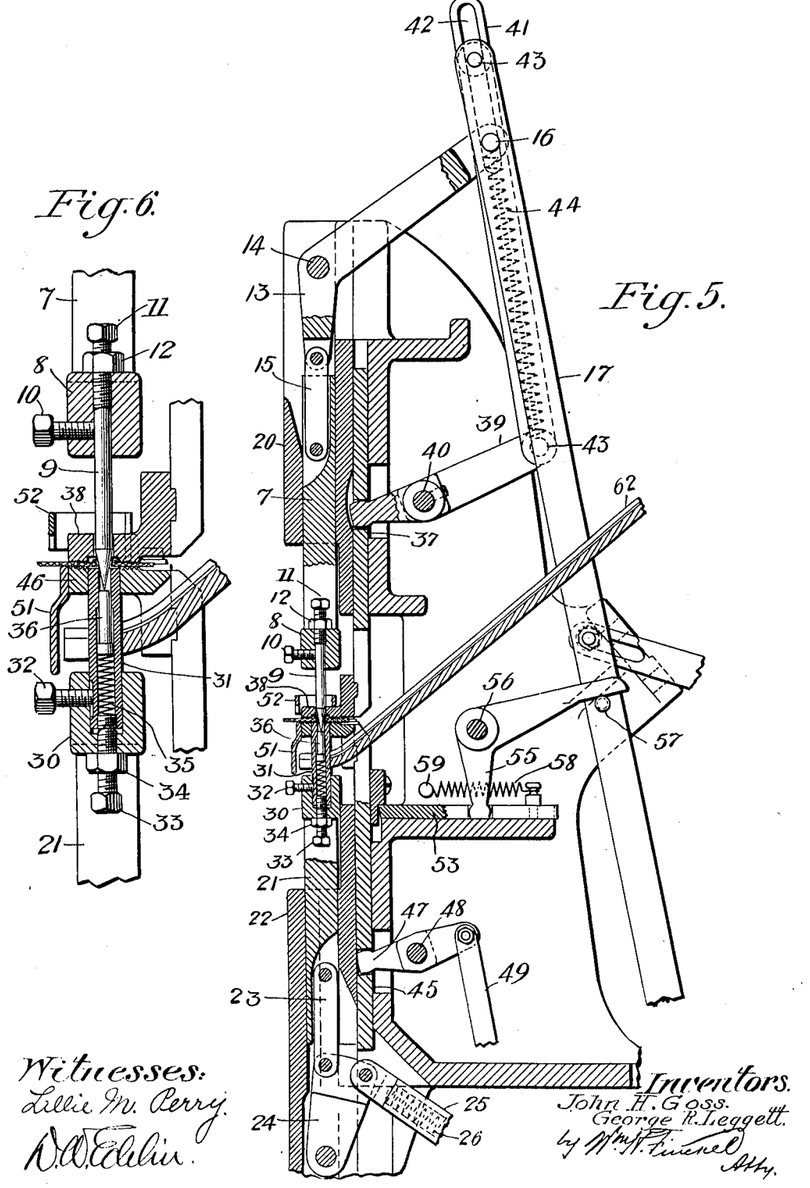
Fig. 5 is a view similar to Fig. 4 but with the positions of the parts changed as they will be when the glove is held in the grippers and has been pierced by the needle.
Fig. 6 is a longitudinal section, on a larger scale, of the needle and eyelet-support and grippers in the same position in which they are shown in Fig. 5.

Adjacent and parallel to the eyelet-support slide 21 is a slide 45, arranged vertically in the head, and having a horizontally projecting gripper-jaw 46 projecting into the paths of movement of the needles and eyelet-supports, and pierced vertically for the passage of the eyelet-supports into it. This slide is engaged by a lever 47, pivoted at 48 to the head of the machine, and engaged by a link 49 with the foot-treadle 4 through a pin and slot connection 50. The jaw 46 has applied to it the depending guide and set-edge 51, and a protector guard 52 rising upwardly around the upper jaw 38.

The slides 37 and 45 and their adjuncts constitute what are herein referred to as the "grippers", and they are designed to come together first and clamp the glove or other article to be supplied with eyelets and hold it securely while being pierced, and while the eyelets are inserted in the openings so pierced, and until the needles are moved out. The lower gripper-jaw is held in position by means of a slide 53 mounted upon the head and adapted to be thrown into engagement at certain points in the cycle of movements with one or another of the steps on a stepped block 54 fast on the back of the slide 45. The slide 53 is drawn out of engagement with the stepped block 54 by a rock-lever 55, pivoted at 56 to the head of the machine, and engaged by a pin 57 on the bar 17 as it rises; and it is normally projected toward such block by a spring 58, Figs. 1, 4 and 5, connecting it independently with the head of the machine through a post 59, Figs. 1, 2, 4 and 5.

Figure 18:
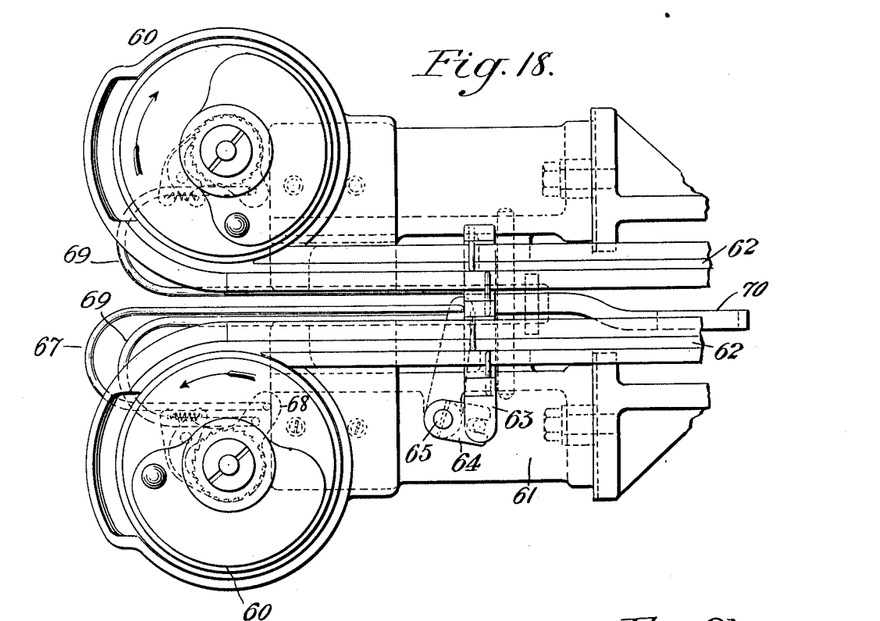
Fig. 18 is a top plan view of the eyelet turrets or hoppers, and adjacent parts.

The hoppers or turrets 60 are mounted on a bracket 61, secured to the head of the machine, and these hoppers may be of any ordinary or approved construction, and discharge into tracks or raceways 62, which deliver the eyelets one at a time to the eyelet-supports, being caught and centered on the pins 36. The descent of the eyelets is regulated by a gate or cut-off 63 which is reciprocated back and forth across the tracks by a crank-arm 64 on a shaft 65, mounted in the bracket 61, and motion is imparted to this shaft by an arm 66 connected by a rod 67 to a pawl-plate 68 on the end of the shaft of one of the hoppers. Each hopper has a pawl-plate 68, and motion is imparted to these pawl-plates by rods 69 connected with one end of a rock-lever 70 arranged upon a pivot 71 in the bracket 61, and having its longer arm longitudinally slitted and connected by pin 72 with the bar 17, so that as the bar rises and falls under the action of the treadle, this lever 70 will be rocked upon its pivot.

The turrets and their appurtenances are shown in detail in Fig. 18, but it is to be understood that the invention is not limited to this particular construction.

Figures 7, 8, 9, 10, 11, 12, 13, 14, 15, 16, 17:
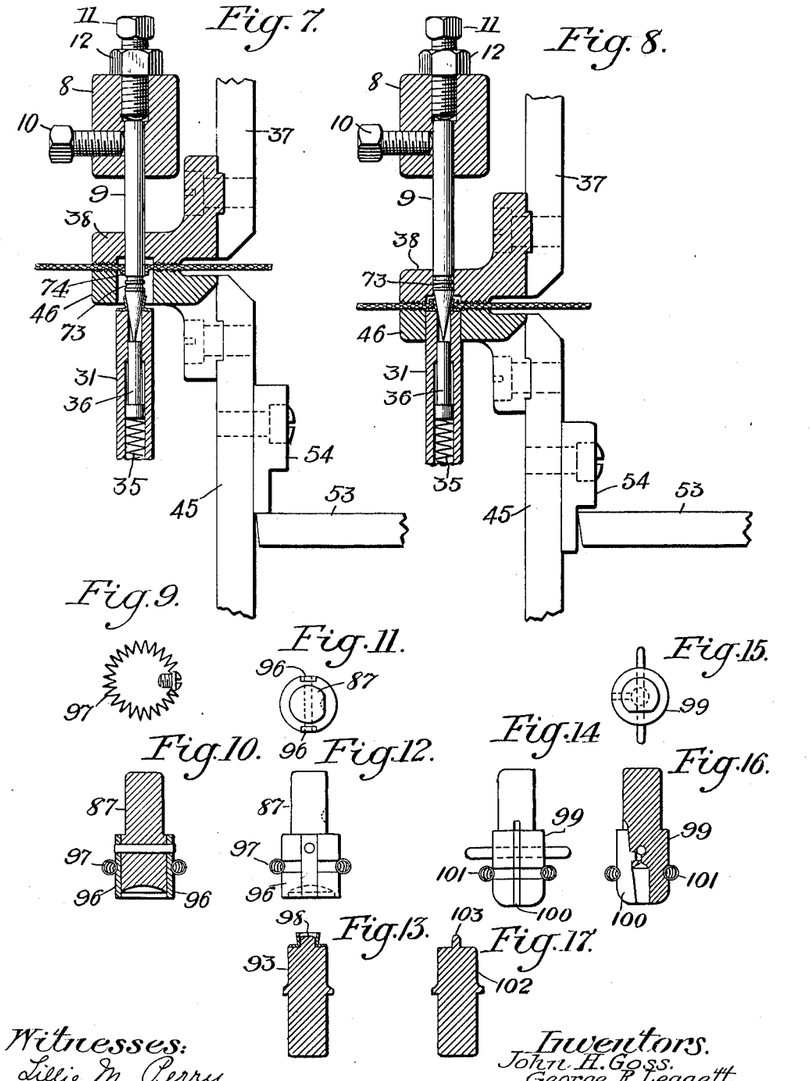

Let it be assumed that the machine is at rest, as shown in Figs. 1 and 4; then the glove that is to receive a pair of eyelets is placed between the jaws of the grippers and the treadle being moved, the rod 17 and the connecting link 25 are moved, resulting in the upward movement of the slide 21, until it reaches its upward position, as shown in Fig. 5; then the rocker arm 24 strikes against the face-plate and thereafter the continued motion of the foot-treadle in the same direction causes the pin 28 to compress the spring 26 through its action on the pin 27, thus permitting a dwell in the slide 21 in its upward motion. The eyelet-supports are thus carried up and into position to received the eyelets from the turrets. The motion of the foot-treadle acting through the rod 17 rocks the lever 13 and this lever through its link 15 acting upon the slide 7, causes said slide to descend, thereby causing the needles to descend. The first part of the upward movement of the bar 17 causes the slide 37 to move downward and grip the goods between the jaws of the grippers, and then the continued downward movement of the slide 7 causes the needles to force their way through the fabric. Since the pins 36 are in their upper position by the time the needles reach their lower position, the eyelets have been located on the tapered parts of the needles, and these pins retreat within the hollow posts 35, as indicated in Figs. 5, 6, 7 and 8. Meanwhile, pin 57 on the bar 17 has come in contact with the rock-lever 55, and rocked it so as to withdraw the slide 53 from the stepped block 54, thus releasing the slides 37 and 45, and allowing the spring 44 to act to force the slides down, with the result that the goods gripped between the grippers on these slides are forced onto the eyelets, or in other words, eyelets are inserted in the holes made in the goods by the descent of the needles through the goods, as represented in Figs. 5 and 6. Since the grippers are gripping the goods tight between them, and as the needles and eyelet-supports have practically no movement at this time, the grippers having just been released from the slide 53, carry the cloth down onto the eyelets, forcing the cloth onto the eyelets. Then the operator releasing the pressure on the treadle allows it to return to its normal position, which in turn causes the needles, the grippers and the eyelet-supports to return to their normal positions ready for the next movement. This completes one cycle of movements of the eyelet-setting machine, and leaves the goods free to be taken out of this machine and put into the cap-attaching machine, to be described.

Where the fabric of the article to be eyeleted is of such character that some threads may be broken by the passage of the needles through it, and the loose ends of broken threads may enter the barrel of the eyelets, it is advisable to so construct the needles as to force these threads away from the open barrel, and to this end, as shown in Figs. 7 and 8, the needles may be provided with circumferential grooves or channels 73. As represented in Fig. 7, as the needles perforate the cloth, the displaced threads may be formed into bur-like projections 74, which would extend downward, following the direction of movement of the needles, and then as the eyelets are moved into the openings, and the needles are withdrawn by upward movement, the grooves would have a tendency to reverse these bur-like projections and carry them upward with the rising needles, and the threads thus would be carried out of the way of the eyelets, as indicated in Fig. 8. These grooves assist in holding the cloth on the larger part of the needle, and hold it with such an amount of friction that as the goods are being forced from the needles onto the eyelets none of the threads will precede the goods and enter inside the eyelets. In this connection it is to be especially noted that there is the drop or descent of the grippers which effects the insertion of the eyelets into the fabric by forcing the fabric onto the eyelets, and this while the eyelets are supported on their supports and centered by the needles within them.

It will be noted that the movements of the foot-treadle to raise the bar 17 have no effect on the link 49, and its connected rock-lever 47, and that slide 53 is never farther from the stepped block 54 than to engage the intermediate step in said block, as represented in Figs. 5 and 8, owing to the presence of the pin and slot connection 50; but upon the return stroke of the treadle, the pin engages the lower end of the slot in the link 49, and then the lever 47 is rocked so as to raise the slide 45 into its normal position, shown in Fig. 4, at which time the spring 58 forces the slide 53 into engagement with the lowermost step of said block, and thus retains the slide 45 in its extreme elevated position, as shown in Figs. 4 and 7.

It will be seen by reference to Figs. 5, 6, 7 and 8, that during the coöperation of the needles and eyelet-supports throughout the operations of piercing the glove and forcing it upon the eyelets, the eyelets are securely held by the needles, and their accurate emplacement thus is insured.

Figure 3:
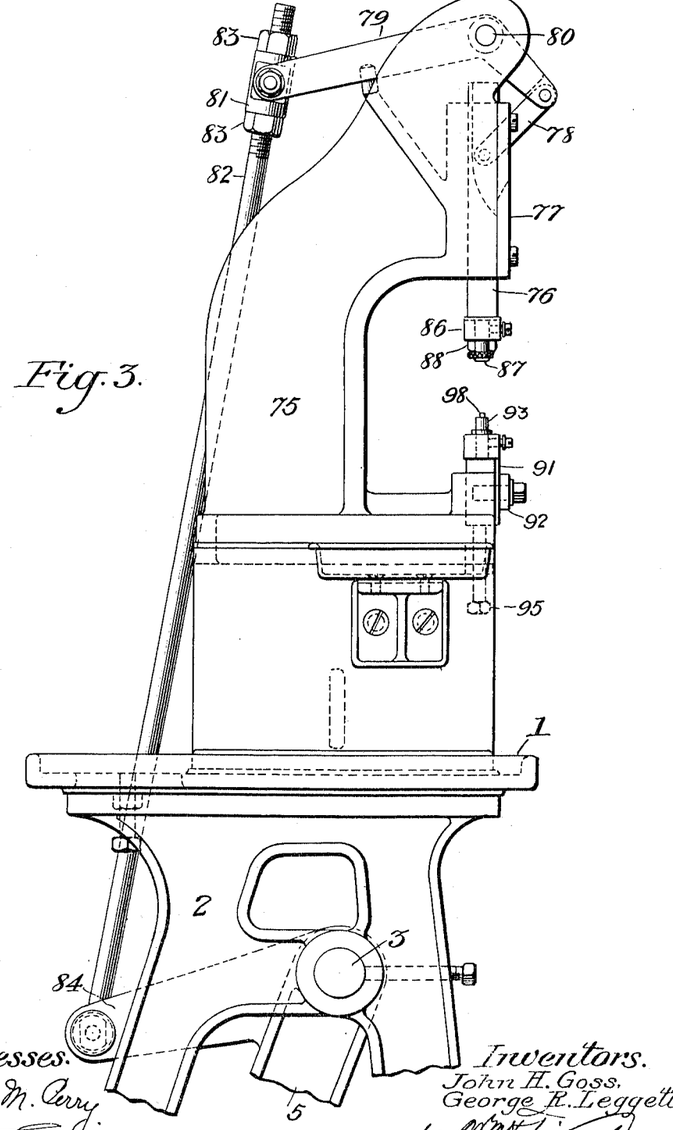
Fig. 3 is a side elevation of the cap-attaching mechanism.

Adjacent to the eyelet-setting mechanism is a head 75 in the face of which is a slide 76 held thereto by a face-plate 77, and connected by a link 78 with one arm of a lever 79 on the pin 80. This lever 79 is pivoted to a swivel-block 81 on the end of a rod 82, and with which it is adjustably connected by means of nuts 83 engaging a screwthreaded portion of said rod. This rod extends down to and is connected with a crank arm 84, which is connected with a treadle 5 mounted on the rod 3 (or other power device may be employed), so that upon rocking the crank-arm, the slide is reciprocated in the head. The bottom of this slide is provided with a die-holder 86, in which are arranged suitable dies 87. The die-holder may be connected with the slide by means of a nut or other fastening device 88, and the dies may be detachably secured in the die-holder by means of pins 89 and the spring 90. Beneath and alined with this last described mechanism is a punch-holder 91, whose stem is arranged in a socket in the head 75, and is held therein by a face-plate 92. This punch-holder is provided with detachable punches 93 held in the punch-holder by means of pins 94 and a spring 94ˣ. The punch-holder is adjusted vertically by means of a set-screw 95.

As shown in Figs. 9 to 12, the dies 87 may have parallel clamps 96, yieldingly held in place by means of an encircling spring 97. As shown in Fig. 13, the punch 92 may have a teat 98 to position the eyelet.

Figure 19:
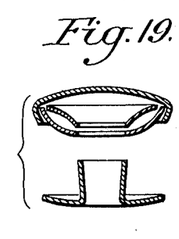
Fig. 19 shows in cross-section one form of cap and eyelet which may be set by the mechanism of this invention.

After the eyelets have been set in the glove, as previously described, the glove is moved to this last described mechanism, and its eyelets placed over the punches 92 and suitable caps are placed in the dies 87 and then these dies are caused to descend on the eyelets and the eyelets enter the caps and are clenched in the caps. As illustrating this operation, it might be supposed that the caps are as shown in the upper view, Fig. 19, and the eyelets are as shown in the lower view of Fig. 19, and the final clenching or setting operation just last described would be represented in Fig. 20.

Figure 20:
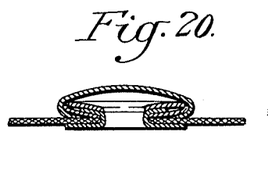
Fig. 20 shows these parts as set.
Figure 21:
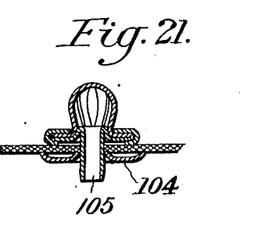
Fig. 21 is a section of one form of stud ready to be set.

The construction of the cap and eyelet and their assembling as in Fig. 20, are well-known, and there are many different constructions embodying the same general principle, to all of which the present invention is applicable by the use of proper dies and punches. So, also, the mechanism may be employed in setting studs, such as are shown in Fig. 21, and in this case the dies may be like those shown in Figs. 14, 15 and 16, comprising a die-body 99, having a yielding member 100, held in position by an encircling spring 101, and mounted in the die-holder described, and the punch 102, Fig. 17, has a teat 103 on which a washer like that shown at 104, Fig. 21, may be mounted and over which the tubular end or eyelet 105 of the stud is clenched. But, as is well-known, some studs are not provided with attached eyelets, but are secured by a separate eyelet, and this invention obviously is adapted for use in connection with such studs.

It is to be understood that this invention is not limited to use in setting glove fasteners, but may be used for setting a great variety of fasteners. And it is to be noted also that the title given to this invention herein and in the claims is not intended to be or to be understood to be a limitation of the invention, but is merely descriptive of the principle of the invention.

As already sufficiently indicated, the machine could be arranged to operate upon one eyelet and one cap, or upon two or more, and hence the claims herein made are to be understood as covering the use of the machine with one or more setting mechanisms.

What we claim is:—

1. In a machine for attaching glove fasteners, the combination of grippers, means to move them toward and from one another, with needles and means to move them toward and through the grippers and the glove held thereby, and eyelet-supports and means to move them toward the grippers and into conjunction with the needles so that the needles will enter and engage the eyelets and hold them, and means to move the grippers conjointly when closed upon the glove to force the glove upon the eyelets while held by the needles.

2. In a machine for attaching glove fasteners, the combination of gripping jaws arranged to approach each other from opposite directions, slides upon which they are mounted, means to further move said grippers conjointly while gripping an article, needles and means to move them downwardly toward and through the grippers and the article held therein, eyelet-supports and means to move them toward the grippers and into operative conjunction with the needles, at which time the grippers receive their conjoint movement downwardly toward the eyelet-supports, to insert the eyelets in the holes in the article made by the needles.

3. In a machine for attaching glove fasteners, vertically reciprocating slides movable toward and from one another, gripping jaws mounted horizontally on said slides and movable with them, a slide having needles fixed thereon, and a slide having disappearing eyelet-supports thereon, said needle-slide and eyelet-supporting slide arranged respectively above and below the gripping jaws, and means to move them toward the gripping jaws, in combination with means to move the gripping jaw slides conjointly in one direction while holding the glove and thereby force the eyelets into the holes made in the glove by the needles.

4. In a machine for attaching glove fasteners, the combination of an upper slide and means to move it up and down, a plurality of needles fixed to and movable with said slide, a lower slide and means to move it toward and from the upper slide, a plurality of eyelet-supports mounted upon said lower slide and movable with it and having eyelet centering pins to receive the eyelets and present them to the needles and then disappear under the pressure of the needles, an eyelet feeding mechanism, vertically reciprocating slides having horizontally projecting parallel gripping jaws extending between and in line with the needles, and means to give the said gripping jaws and slides a conjoint downward movement, in addition to their individual downward movement, so as to force the material grasped between the jaws down upon the eyelets held in the eyelet-supports and cause them to enter holes made in the glove by the needles and while the said eyelets are centered upon and engaged by the needles.

5. In a machine for attaching glove fasteners, the combination of an upper slide and means to move it up and down, a plurality of needles fixed to and movable with said slide, a lower slide and means to move it toward and from the upper slide, a plurality of eyelet-supports mounted upon said lower slide and movable with it and having eyelet centering pins to receive the eyelets and present them to the needles and then disappear under the pressure of the needles, an eyelet feeding mechanism, vertically reciprocating slides having horizontally projecting parallel gripping jaws extending between and in line with the needles, means to give the said gripping jaws and slides a conjoint downward movement, in addition to their individual downward movement, so as to force the material grasped between the jaws down upon the eyelets held in the eyelet-supports and cause them to enter the holes made in the glove by the needles and while the said eyelets are centered upon and engaged by the needles, and mechanism to receive the thus set or inserted eyelets and cap them.

6. In a machine for attaching glove fasteners, means to clamp or grip the article, means to produce openings in the article for the reception of eyelets, said opening means including a suitable number of needles having tapering leading ends and circumferential grooves at the bases of such ends, and means to present the eyelets to the thus clamped article and to enter said eyelets in the openings made in the article, the grooves in the needles serving to disperse any fibers or broken threads of the article from the openings in said eyelets.

In testimony whereof we have hereunto set our hands this 26th day of June A. D. 1909.

JOHN H. GOSS.
GEORGE R. LEGGETT.

Witnesses:
HENRY FEHL,
G. F. HODGES.